United States Patent [19]

Lill

[11] 4,402,603
[45] Sep. 6, 1983

[54] FOUR WHEEL ALIGNMENT APPARATUS AND METHOD

[75] Inventor: Melvin H. Lill, San Jose, Calif.

[73] Assignee: FMC Corporation, Chicago, Ill.

[21] Appl. No.: 261,444

[22] Filed: May 8, 1981

[51] Int. Cl.³ .................. G01B 11/26; G01B 5/255
[52] U.S. Cl. .................................. 356/152; 33/288; 356/155
[58] Field of Search .................. 356/141, 152, 155; 33/288

[56] References Cited

U.S. PATENT DOCUMENTS

| | | | |
|---|---|---|---|
| 3,091,862 | 6/1963 | MacMillan | 33/46 |
| 3,855,709 | 12/1974 | Hirmann | 33/203.15 |
| 4,058,903 | 11/1977 | Wilkerson | 33/288 |
| 4,097,157 | 6/1978 | Lill | 356/152 |
| 4,130,362 | 12/1978 | Lill et al. | 356/152 |
| 4,150,897 | 4/1979 | Roberts, Jr. et al. | 356/152 |
| 4,154,531 | 5/1979 | Roberts, Jr. et al. | 356/152 |
| 4,159,574 | 7/1979 | Samuelsson et al. | 33/288 |
| 4,239,389 | 12/1980 | Hollandsworth | 356/152 |
| 4,302,104 | 11/1981 | Hunter | 356/152 |
| 4,319,838 | 3/1982 | Grossman et al. | 356/152 |
| 4,336,658 | 6/1982 | January et al. | 356/152 |
| 4,344,234 | 8/1982 | Lill et al. | 356/155 |

FOREIGN PATENT DOCUMENTS 925691  5/1973  Canada .................. 356/155

Primary Examiner—S. C. Buczinski
Attorney, Agent, or Firm—H. M. Stanley; R.B. Megley

[57] ABSTRACT

Apparatus and method are disclosed by which toe is measured relative to a vehicle centerline or a nonsteerable wheel rolling direction for all four wheels on a vehicle having a pair of front steerable wheels and a pair of rear nonsteerable wheels. An alignment head is placed on one of the front wheels and another alignment head is placed on one of the rear wheels, both wheels being on the same side of the vehicle. The alignment heads project a beam pattern across the vehicle at the front and the rear. Reflectors are mounted on the other wheels at the front and the rear to intercept and reflect the beams back toward detectors included in the alignment heads. A beam pattern is also projected rearwardly along the length of the vehicle chassis from the alignment head mounted on the front wheel. A rear wheel mounted reflector intercepts the rearwardly projected beam pattern and reflects it back toward a detector in the front wheel mounted alignment head. Structure is provided on each of the rear wheels which provides an optical path which may be directed toward points at the front wheels which are equidistant from a center point between the front wheel pair. Measurements of total toe for each wheel pair and of individual toe for each wheel are obtained through use of the disclosed structure and process.

12 Claims, 1 Drawing Figure

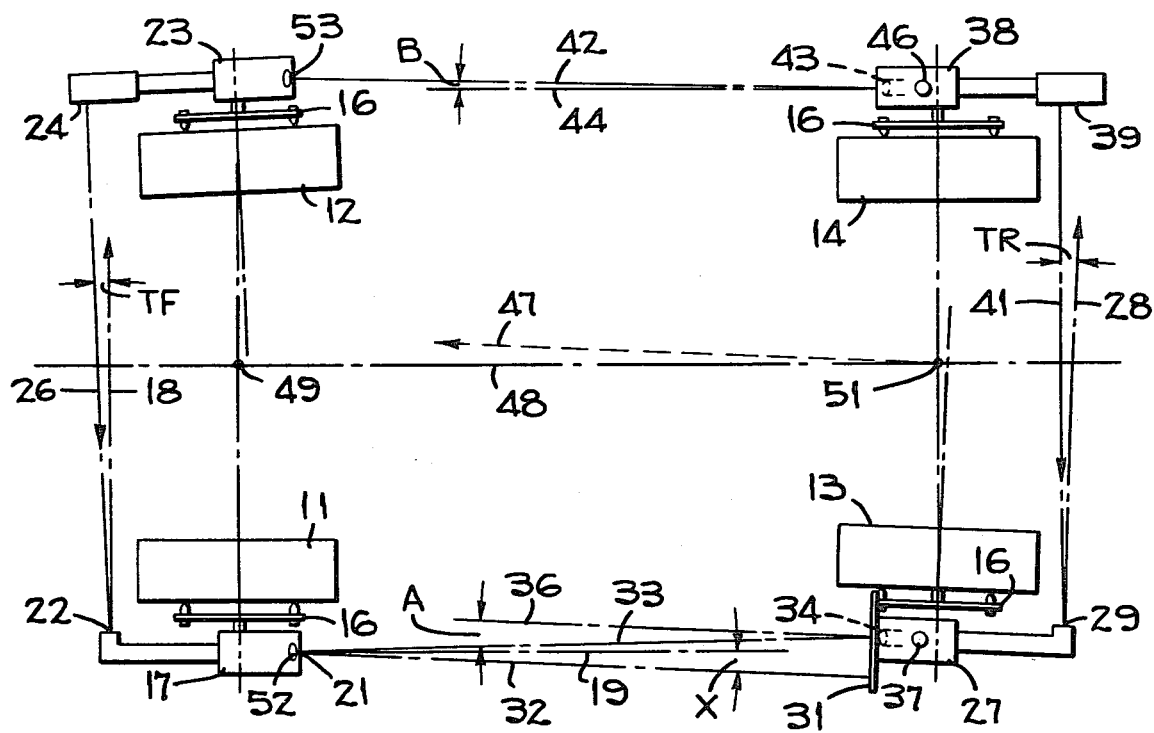

FOUR WHEEL ALIGNMENT APPARATUS AND METHOD

BACKGROUND OF THE INVENTION

1. Field of the Invention

This invention relates to apparatus and method providing alignment measures for each of the wheels on a chassis supported by a steerable wheel pair and a nonsteerable pair, and more particularly such apparatus and method wherein wheel toe measurement is provided relative to either the chassis centerline or the average rear wheel rolling direction.

2. Description of the Prior Art

Apparatus providing rearwardly projected light beams for use in determining the inclinations of front steerable wheels relative to the axis of rotation of one of the rear nonsteerable wheels may be found in U.S. Pat. Nos. 4,154,531, Roberts, Jr. et al, issued May 15, 1979; 4,150,897, Roberts, Jr. et al, issued Apr. 24, 1979; 4,130,362, Lill et al, issued Dec. 19, 1978; and 4,097,157, Lill, issued June 27, 1978, all of which are currently assigned to the assignee of record of the invention disclosed herein. The 4,154,531 patent discloses apparatus wherein the rearwardly projected beam is caused to swing through a predetermined angle. The beam is reflected by a mirror mounted in predetermined relationship with the axis of rotation of one of the rear nonsteerable wheels so that the oscillating beam is reflected back to a target mounted on the front steerable wheel on the same side of the vehicle. The time relationship between the instants when the projected oscillating beam is received by light sensitive devices when reflected toward a front wheel mounted target is used to determine the inclination of the front steerable wheel in the horizontal or toe plane.

The 4,130,362 patent disclosure provides a multiplicity of beams projected at known angles relative to a reference angle from a projector mounted on one of the steerable front wheels of the vehicle. A mirror mounted on the rear wheel on the same side of the vehicle in predetermined relationship with the axis of rotation of the rear wheel reflects one of the projected beams back to the front wheel assembly. The reflected and received beam from the multiplicity of beams determines the inclination of the front wheel in the horizontal or toe plane.

4,097,157 patent disclosure makes reference to a rearwardly projected beam which is reflected by a mirror mounted in predetermined relationship with a nonsteerable wheel on the same side of the vehicle. The reflected beam is received at an encoding target which is mounted on the front wheel on the same side of the vehicle to provide an indication of the inclination of the front wheel in the horizontal or toe plane relative to the axis of rotation of the rear wheel.

The 4,150,897 patent disclosure relates to a rearwardly transmitted light beam from a front steerable wheel mounted assembly which is reflected by a rear wheel mounted mirror having predetermined orientation relative to the axis of rotation of the rear wheel. The front steerable wheels are adjusted in steering direction until the beam reflected from the rear wheel mounted mirror strikes a calibration point on the front wheel mounted assembly. The mirror on the rear wheel is then moved laterally so that the projected beam falls on a scale on the mirror at a point which is related to the desired toe setting for the front steerable wheels of the vehicle. The front steerable wheel is adjusted in toe so that the projected beam moves to a desired location on the rear mirror thereby setting known front wheel toe into the one front steerable wheel. The toe of the other front steerable wheel is set in the usual manner to obtain the desired total front steerable wheel toe. The apparatus automatically adjusts for different vehicle wheel spacings.

An optical system is disclosed in U.S. Pat. No. 4,058,903, Wilkerson, issued Nov. 22, 1977, in which sighting tubes and scales are provided at both the front and the rear of the vehicle. These scales and sighting tubes are supported by structure adjacent to the vehicle. The scales are sighted through the tubes so that information relating to the angular orientation of each wheel pair axis relative to a vehicle steering axis is obtained. The stated purpose of the apparatus is to ascertain certain faults in the alignment of the vehicle frame rather than to align the wheels of the vehicle.

U.S. Pat. No. 3,855,709, Hirmann, issued Dec. 24, 1974 discloses a system which includes an electromechanical computer which ascertains the centerline of a vehicle and makes wheel alignment measurements relative to the centerline. The apparatus disclosed by Hirmann is fixed in position surrounding a space into which a vehicle is driven. The alignment characteristics of the vehicle wheels are thereafter measured by the apparatus fixed in position and surrounding the vehicle.

An apparatus is disclosed in U.S. Pat. No. 3,091,862, MacMillan, issued June 4, 1963, in which a pair of right and left hand targets are positioned in known relationship with the rear wheels on a vehicle. Sighting tubes are provided which are aligned with the planes parallel to the steerable front wheel planes and which are directed rearwardly toward the targets on each side of the vehicle. The steering angle of the front wheels is adjusted until similar points on the rear positioned targets are observed through the sight tubes. The wheels are thereby aligned straight ahead relative to the rear wheels and the steering wheel inside the car may be adjusted to a centered position by well known mechanical adjustments.

SUMMARY OF THE INVENTION

According to the present invention apparatus is provided for simultaneously measuring the individual toe of a pair of steerable front wheels and a pair of nonsteerable rear wheels which support a vehicle chassis. A front alignment head is mounted on one front wheel projecting a front cross beam pattern across the vehicle widths and a front reflector is mounted on the other front wheel disposed to intercept the front cross beam pattern and to reflect beams toward the one front wheel. A front beam detector is positioned on the one front wheel to receive the reflected front cross beams and to provide a signal indicative of total front wheel toe. A rearward beam pattern projector is also mounted on the one front wheel so that a beam pattern is projected toward the one rear wheel on the same side of the chassis. A rear front facing reflector is mounted on the one rear wheel in a position to intercept the rearwardly projected pattern and to reflect beams toward the one front wheel. A rearward facing beam detector is mounted on the one front wheel disposed to receive the reflected beams from the rear reflector and to provide a signal which is indicative of the angular relationship between the planes of the one front and the one rear wheels. A rear alignment head is mounted on the one rear wheel operating to project a rear cross beam pattern across the vehicle widths. A rear reflector is mounted on the other rear wheel disposed to intercept the rear cross beam pattern and to reflect beams toward the one rear wheel. A rear beam detector is mounted on the one rear wheel disposed to receive the reflected rear cross beams and to provide a signal indicative of total rear wheel toe. Means is provided for receiving the total front and rear toe signals and the angular relationship signal for the one front and the one rear wheels. The last named means provides individual toe readings for each of the front and the rear wheels.

In accordance with the method of the present invention measurements are provided for the individual toe for a steerable wheel pair and a nonsteerable wheel pair supporting a vehicle chassis. The method includes measuring the total toe of the steerable wheel pair directly and measuring the total toe of the nonsteerable wheel pair directly. The total toe measuring steps are performed simultaneously. The toe of one steerable wheel relative to the plane of the one nonsteerable wheel on the same side of the chassis is then determined and the toe of each wheel is then referenced to the bisector of the nonsteerable wheel pair total toe angle.

BRIEF DESCRIPTION OF THE DRAWING

The drawing FIGURE is a plan view showing the four supporting wheels for a vehicle chassis with the apparatus of the present invention mounted thereon.

DESCRIPTION OF THE PREFERRED EMBODIMENT

Referring now to the drawing FIGURE the four wheels operating to support a vehicle chassis in rolling relationship to an underlying surface are shown. A left front steerable wheel 11 and a right front steerable wheel 12 are positioned at the forward portion of the chassis and a left rear wheel 13 and a right rear wheel 14 are positioned at the aft end of the vehicle chassis. A wheel clamp 16 is mounted on each of the four wheels so that aligner heads and reflecting surfaces may be mounted on appropriate ones of the wheels. The wheel clamp is exemplified by the clamp disclosed in U.S. patent application Ser. No. 112,764, filed Jan. 17, 1980, Ragan, soon to issue as a U.S. patent.

A wheel alignment head 17 is mounted to the wheel clamp 16 on the left front wheel 11. The alignment head may be any one of the types shown in U.S. Pat. Nos. 4,154,531; 4,150,897; 4,130,362; or 4,097,157, all mentioned hereinbefore. The alignment head 17, by way of brief review, is mounted on the wheel clamp in such a fashion that a beam pattern indicated generally at 18 is cast across the width of the vehicle chassis at the front thereof. The beam pattern has a reference direction which is generally parallel to the rotation axis of the left front wheel 11. The alignment head 17 also casts a beam pattern rearwardly of the chassis which may be seen in the FIGURE as item 19. The rearward cast beam pattern has a reference or zero direction which extends perpendicularly from the axis of rotation of the left front wheel 11. An appropriate beam detector as disclosed in any one of the aforementioned four patent disclosures is positioned in the alignment head at 21 to receive light beams traveling along the length of the vehicle chassis and at 22 to receive beams traveling across the front width of the chassis.

A balanced front reflector assembly 23 is mounted on the wheel clamp 16 on the right front wheel 12. The reflector assembly has a reflecting surface 24 fixed thereon which presents an effective reflecting surface oriented perpendicularly to the rotation axis of the right front wheel 12. The reflecting surface 24 may be a roof type mirror as disclosed in U.S. Pat. No. 4,154,531 mentioned hereinbefore, or it may be a planar mirror. The roof type mirror provides the advantage over the planar type mirror of requiring less critical adjustments in placing the cross projector for the beam 18 and the mirror 24 in relatively the same horizontal plane. In any event, the effective reflecting surface reflects a beam 26 back toward the detector 22 in the alignment head 17. The detector 22 is capable of identifying the portion of the beam pattern reflected thereto, thereby providing a signal which is indicative of the total toe between the two front steerable wheels 11 and 12. The total front toe is indicated in the drawing FIGURE by the symbol TF.

Another alignment head 27 is mounted on the left rear wheel 13, also being exemplified by one of the alignment head types disclosed in U.S. Pat. Nos. 4,154,531; 4,150,897; 4,130,362; or 4,097,157, discussed hereinbefore. The alignment head 27 is mounted on the wheel clamp 16 on the left rear wheel and is configured to project a beam pattern 28 across the width of the vehicle chassis at the rear thereof. The beam pattern 28 has a reference direction which is substantially parallel to the axis of rotation of the left rear wheel 13. The alignment head 27 also has a detector 29 therein for receiving light beams projected across the width of the chassis at the rear. A planar mirror 31 (a roof type mirror as mentioned hereinbefore may be used) is mounted on the alignment head 27 in a position to intercept the beam pattern 19 projected from the "back" side of the alignment head 17. The reflector 31 is oriented so that an effective reflecting surface is presented which is substantially parallel with the axis of rotation of the left rear wheel 13. A portion of the beam pattern 19 which impinges on the reflecting surface 31 is shown being reflected along a path 32 to impinge on the detector 21 in the alignment head 17. The beam 32 is identifiable by the detector 21 as explained in the alignment head patent disclosures discussed hereinbefore so that a signal is obtained which is indicative of the angular relationship between the plane of rotation of the left front wheel 11 and the plane of rotation of the left rear wheel 13. As a consequence, a signal indicative of the angle illustrated at "X" in the FIGURE is obtained.

The aligner head 27 is modified to include an optical system which provides an optical path 33 through a lens 34 mounted on the "back" side of the aligner head 27. A reference direction for the optical path is shown at 36. The direction 36 is oriented generally perpendicular to the axis of rotation for the left rear wheel 13. The optical path 33 may be adjusted angularly by a knob 37 to depart in either direction from the reference direction 36. Also associated with the knob 37 is a potentiometer which provides a signal indicative of the angle of departure of the optical path 33 from the reference direction 36. Such an angle is shown in the FIGURE as A. The structure for providing the optical path and the adjustment and signal generator associated therewith may be of the type of providing a viewing path as fully disclosed in copending U.S. patent application Ser. No. 261,445 or of the type providing a projected beam of light as disclosed in copending U.S. patent application Ser. No. 261,441 both applications filed on even date herewith.

A balanced rear mounted reflector and projector assembly 38 is seen mounted on the wheel clamp 16 attached to the right rear wheel 14. A reflector 39 is included in the reflector/projector assembly 38 which may be of the roof mirror type or the planar mirror type providing an effective reflecting plane which is oriented orthogonally with respect to the axis of rotation of the right rear wheel 14. The reflector 39 is disposed in a position to intercept the beam pattern projected by the alignment head 27 and to thereby reflect a portion 41 of the beam pattern back to the detector 29. The detector provides a signal indicative of the angle between the projected and reflected beams 28 and 41, thereby providing an indication of the total toe angle between the rear wheels 13 and 14 as indicated in the drawing FIGURE by the symbol TR.

The rear reflector projector assembly 38 also contains optical means exemplified by either of the assemblies disclosed in copending U.S. patent application Ser. Nos. 261,445 and 261,441 mentioned hereinbefore. An optical path 42 extends from a lens 43 situated in the "back" of the reflector/projector assembly 38. The optical path 42 may also be adjusted angularly with respect to a reference direction 44 which extends generally orthogonally to the axis of rotation of the right rear wheel 14. The direction of the optical path 42 is adjusted by turning a knob 46 which also has an associated potentiometer, or other appropriate type of signal generator, as disclosed in either of the aforementioned copending applications. The signal generator provides a signal which is indicative of the angle between the optical path 42 and the reference 44 illustrated in the drawing FIGURE as the angle B.

Circuitry is provided which receives the signals representative of the quantities TF, TR, X, A and B from which individual toe angle measurements are obtained as hereinafter described.

The manner in which the foregoing apparatus functions to provide individual wheel toe angle measurements will now be described. The individual assemblies 17, 23, 27 and 38 are mounted on their respective wheels by means of the wheel clamps 16. In this fashion the total toe of the front steerable wheel pair 11 and 12 and the rear nonsteerable wheel pair 13 and 14 (TF and TR respectively) are directly measured simultaneously. The following sign convention is used:
1. TF is positive counterclockwise from reference 18.
2. TR is positive clockwise from reference 28.
3. X is positive counterclockwise from reference 19.
4. A is positive counterclockwise from reference 36.
5. B is positive clockwise from reference 44.

A system is provided with two reading positions; tracktoe and frametoe. In the tracktoe setting the toe of each of the wheels is referenced to an average rear wheel rolling direction 27 which is the bisector of the total rear toe angle. In such an instance the following toe readings for the individual wheels are obtained:

TRACKTOE RELATIONSHIPS

LEFT FRONT $= X - TR/2$
RIGHT FRONT $= TF - X + TR/2$
LEFT REAR $= -TR/2$
RIGHT REAR $= -TR/2$

The centerline of the chassis is shown in the drawing FIGURE at 48 extending through points 49 and 51 which are equidistant between the front steerable wheels 11 and 12 and the rear nonsteerable wheels 13 and 14 respectively. A point 52 is shown on the "back" side of the alignment head 17 and a point 53 is shown on the "back" side of the balanced front reflector assembly 23. The points 52 and 53 are equidistant from the point 49, the center point between the front wheels 11 and 12. The projecting lens 34 and 43 on the alignment head 27 and the rear reflector/projector assembly 38 respectively are substantially equidistant from the center point 51 between the rear nonsteerable wheels 13 and 14. Therefore, when the optical paths 33 and 42 are directed toward the points 52 and 53 on the same side of the vehicle chassis, the angle of departure of the planes of each of the rear wheels 13 and 14 from parallelism with the chassis centerline 48 is indicated by the signals indicative of the angles A and B. Now the directly measured rear toe, when taking the angles A and B into consideration, is referenced to the chassis centerline 48 as seen in the following relationships.

FRAMETOE RELATIONSHIPS

LEFT REAR $= TR/2 + (A-B)/2$
RIGHT REAR $= TR/2 - (A-B)/2$

As a matter of interest it may be seen that the left and right front toe may also be referenced to the chassis centerline 48 if so desired. However, it is desirable to set the front toe with the steering wheel centered to be split about the average rear wheel rolling direction 47. Consequentially the rear toe is customarily set in the frametoe mode and the front toe is customarily set in the tracktoe mode. This provides a measurement of rear toe indicated relative to chassis centerline (to ascertain if the rear toe is within specifications relative to the centerline) and provides for setting of the front steerable wheels relative to the average rear wheel rolling direction 47. While an attempt may be made to set the rear wheel toe relative to the chassis centerline, there would likely be a small error at least in such a setting. If the front wheels were set in toe in relationship to the chassis centerline (frametoe mode) then the error between the average rear wheel rolling direction 47 and the chassis centerline 48 would accumulate with the error in setting the front toe so that a larger than desirable error may be obtained in vehicle tracking. As a matter of interest, the frametoe relationships for the front wheels are setforth here:

FRAMETOE RELATIONSHIPS

LEFT FRONT $= X - (A-B)/2 - TR/2$
RIGHT FRONT $= TF - X + (A-B)/2 + TR/2$

Although the best mode contemplated for carrying out the present invention has been herein shown and described, it will be apparent that modification and variation may be made without departing from what is regarded to be the subject matter of the invention.

What is claimed is:
1. Apparatus for simultaneously measuring toe of steerable and nonsteerable wheel pairs supporting a vehicle chassis wherein a first alignment head is mounted on one steerable wheel projecting a first beam pattern across the width of the vehicle, said pattern having a reference direction substantially parallel to the rotation axis of said one steerable wheel, a first reflector is mounted on the other steerable wheel having an effective reflecting plane oriented normal to said other wheel rotation axis and disposed to intercept said first beam pattern and to reflect said pattern toward said one steerable wheel, a first beam detector is included in said first alignment head operating to receive said reflected first pattern and to provide a signal indicative of total toe between the steerable wheels, a second beam pattern projector is included in said first alignment head projecting a beam toward the one nonsteerable wheel nearest said one steerable wheel and having a reference direction substantially normal to said one steerable wheel rotation axis, a second beam detector is included adjacent to said second projector, and wherein a second reflector is mounted on the one nonsteerable wheel having an effective reflecting plane in substantially parallel alignment with the rotation axis thereof, so that said second beam pattern is reflected toward said second detector to thereby provide a signal indicative of the toe of said one steerable wheel relative to said one nonsteerable wheel rotation axis, comprising a second alignment head mounted on said one nonsteerable wheel projecting a third beam pattern across the width of the vehicle, said third pattern having a reference direction substantially parallel to the rotation axis of said one nonsteerable wheel, a third reflector mounted on the other nonsteerable wheel having an effective reflecting plane oriented normal to said other nonsteerable wheel rotation axis and disposed to intercept said third beam pattern and to reflect said pattern toward said one nonsteerable wheel, a third beam detector in said second alignment head operating to receive said reflected third beam pattern and to provide a signal indicative of total toe between the nonsteerable wheels, and means for receiving said signals indicative of total steerable and nonsteerable wheel toe and of the toe of said one steerable wheel relative to said one nonsteerable wheel rotation axis and for providing individual wheel toe readings.

2. Apparatus as in claim 1 wherein said second alignment head comprises a first optical means providing a first optical path extending toward said one steerable wheel and having a reference direction substantially normal to said one nonsteerable wheel rotation axis, means for adjusting the direction of said first optical path relative to said reference direction, and a first signal generator coupled to said means for adjusting said first optical path direction providing a signal indicative of deviation of said first optical path from said reference direction, together with a second optical means mounted on said other nonsteerable wheel providing a second optical path extending toward said other steerable wheel and having a reference direction substantially normal to said other nonsteerable wheel rotation axis, means for adjusting the direction of said second optical path relative to said reference direction, and a second signal generator coupled to said means for adjusting said second optical path direction providing a signal indicative of deviation of said second optical path from said reference direction, so that when said first and second optical paths are directed toward respective points equidistant from a center point between said steerable wheels said signals are indicative of deviation of respective nonsteerable wheels relative to a direction substantially parallel to the chassis centerline.

3. Apparatus as in claim 2 wherein said first and second optical means comprise
first and second lens systems respectively and said optical paths are viewing paths.

4. Apparatus as in claim 2 wherein said first and second optical means comprise
first and second light beam projectors and said optical paths are light beam projections.

5. A method of measuring individual toe for a steerable wheel pair and a nonsteerable wheel pair supporting a vehicle chassis, comprising the steps of mounting a toe measurement device on each of the wheels in each of the wheel pairs, communicating directly the toe measurement device on one steerable wheel with the toe measurement device on the other steerable wheel, whereby the total toe of the steerable wheel pair is measured directly, communicating directly the toe measurement device on one nonsteerable wheel with the toe measurement device on the other nonsteerable wheel, whereby the total toe of the nonsteerable wheel pair is measured directly, determining the toe of one steerable wheel relative to the plane of the one nonsteerable wheel on the same side of the chassis, and referencing the toe of each wheel to the bisector of the nonsteerable wheel pair total toe angle.

6. The method of claim 5 wherein a chassis centerline extends through points midway between the steerable wheel pair and the nonsteerable wheel pair, said step of referencing comprising measuring the deviation of the plane of one nonsteerable wheel from parallelism with the chassis centerline, measuring the deviation of the plane of the other nonsteerable wheel from parallelism with the chassis centerline, whereby nonsteerable wheel toe may be adjusted so that the nonsteerable wheel total toe angle bisector is substantially coincident with the chassis centerline.

7. A method of measuring individual toe for wheel pairs mounted on front and rear axles of a vehicle chassis, comprising the steps of mounting a toe measurement device on each wheel in each pair of wheels, communicating directly the toe measurement devices on wheels on each axle, whereby the total toe of the wheels on each axle is measured directly and simultaneously, determining the angular relationship of the plane of one wheel on one axle relative to the plane of one wheel on the other axle on the same side of the chassis, and referencing the toe of each wheel to the bisector of the total toe angle of the wheels on the other axle.

8. The method of claim 7 wherein a chassis centerline extends through the points on the axles midway between the pairs of wheels, said
step of referencing comprising
measuring the deviation of the plane of the one wheel on the other axle from parallelism with the chassis centerline, measuring the deviation of the plane of the other wheel on the other axle from parallelism with the chassis centerline, whereby the toe of each wheel may be referenced to the centerline of the chassis.

9. Apparatus for simultaneously measuring individual toe of steerable front and nonsteerable wheels supporting a vehicle chassis comprising a front alignment head mounted on one front wheel projecting a front cross beam pattern across the vehicle width, a front reflector mounted on the other front wheel disposed to intercept said front cross beam pattern and to reflect beams toward said one front wheel, a front beam detector on said one front wheel disposed to receive said reflected front cross beams and providing a signal indicative of total front wheel toe, a rearward beam pattern projector on said one front wheel projecting a pattern toward the one rear wheel on the same side of the chassis, a rear front facing reflector mounted on the one rear wheel disposed to intercept said rearwardly projected pattern and to reflect beams toward the one front wheel, a rearward facing beam detector mounted on the one front wheel disposed to receive said reflected beams from said rear reflector and to provide a signal indicative of the angular relationship between the planes of the one front and one rear wheels, a rear alignment head mounted on said one rear wheel projecting a rear cross beam pattern across the vehicle width, a rear reflector mounted on the other rear wheel disposed to intercept said rear cross beam pattern and to reflect beams toward said one rear wheel, a rear beam detector on said one rear wheel disposed to receive said reflected rear cross beams and providing a signal indicative of total rear wheel toe, and means for receiving said total front and rear toe signals and said angular relationship signal for the one front and one rear wheels and for providing individual toe readings for each of the front and rear wheels.

10. Apparatus as in claim 9 wherein said rear alignment head comprises first optical means providing a first optical path extending toward said one front wheel, means for adjusting the direction of said first optical path, and a first signal generator coupled to said means for adjusting said first optical path, together with a second optical means mounted on said other rear wheel providing a second optical path extending toward said other front wheel, means for adjusting the direction of said second optical path, a second signal generator coupled to said means for adjusting said second optical path, so that when said first and second optical paths are directed toward separate points equidistant from a center point between said front wheels said signal generators provide signals indicative of deviation of the respective rear wheels from parallelism with the chassis centerline.

11. Apparatus as in claim 10 wherein said first and second optical means comprise first and second lens systems respectively and said optical paths are viewing paths.

12. Apparatus as in claim 10 wherein said first and second optical means comprise first and second light beam projectors and said optical paths are light beam projections.

* * * * *